(12) United States Patent
Kowarz et al.

(10) Patent No.: US 6,381,062 B1
(45) Date of Patent: Apr. 30, 2002

(54) OPTICAL DATA MODULATION SYSTEM WITH SELF-DAMPED DIFFRACTIVE LIGHT MODULATOR

(75) Inventors: Marek W. Kowarz, Rochester; Edward P. Furlani, Lancaster, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/757,340

(22) Filed: Jan. 9, 2001

(51) Int. Cl.[7] .............................................. G02B 26/00
(52) U.S. Cl. .................. 359/291; 359/290; 359/291; 359/292; 359/572; 359/230; 359/295
(58) Field of Search .................. 359/290, 291, 359/292, 295, 572, 573, 224, 230, 231, 248

(56) References Cited

U.S. PATENT DOCUMENTS

| | | |
|---|---|---|
| 5,311,360 A | 5/1994 | Bloom et al. |
| 5,459,610 A | 10/1995 | Bloom et al. |
| 5,677,783 A | 10/1997 | Bloom et al. |

OTHER PUBLICATIONS

"Equivalent–Circuit Model of the Squeezed Gas Film in a Silicon Accelerometer", by Timo Veijola et el., Sensors and Actuators A 48, 1995, pp. 239–248.

"Theory and Simulation of Viscous Damped Reflection Phase Gratings", by E. Furlani, J. Phys. D: Appl. Phys, 32 (4), 1999, pp. 412–416.

*Primary Examiner*—Hung Xuan Dang
*Assistant Examiner*—Tuyen Tra
(74) *Attorney, Agent, or Firm*—Raymond L. Owens

(57) ABSTRACT

A system for modulating a beam of light in accordance with an input data stream having a data rate greater than 2 MHz, includes a source of light for directing light along a predetermined path; a self-damped diffractive light modulator disposed in the predetermined path and having a plurality of spaced apart self-damped deformable elements being disposed relative to each other and secured at opposite ends and suspended above and movable into a channel containing a gas, and each spaced apart self-damped deformable element having at least one reflective surface. The spaced apart self-damped deformable elements respond to an input data stream and are sufficiently damped to minimize the introduction of data errors into the modulator light beam.

7 Claims, 8 Drawing Sheets

OPTICAL DATA MODULATION SYSTEM WITH SELF-DAMPED DIFFRACTIVE LIGHT MODULATOR

CROSS REFERENCE TO RELATED APPLICATION

Reference is made to commonly assigned U.S. patent application Ser. No. 09/757,341, filed concurrently herewith, entitled "Optical Data Modulation System With Self-Damped Electromechanical Conformal Grating" by Furlani et al, the disclosure of which is incorporated herein.

FIELD OF THE INVENTION

The present invention relates to the modulation of optical signals, and more particularly, to an optical modulation system which includes a self-damped diffractive light modulator.

BACKGROUND OF THE INVENTION

High-speed optical data modulation systems are used for various applications including optical data storage and communications. These systems require data throughput in the megahertz frequency range. Substantial progress has been made in the development and implementation of microelectro-mechanical (MEMS) based light modulators that operate efficiently at these frequencies. Specifically, Bloom et al. in U.S. Pat. No. 5,311,360 describe an apparatus and method of fabrication for a device for optical beam modulation, known to one skilled in the art as a grating light valve (GLV). Bloom et al. described a similar device in U. S. Pat. No. , 5,459,610, with changes in the structure that included: 1) patterned raised areas beneath the ribbons to minimize contact area to obviate stiction between the ribbon and substrate; 2) an alternative device design in which the spacing between ribbons was decreased and alternate ribbons were actuated to produce good contrast; 3) solid supports to fix alternate ribbons; and 4) an alternative device design that produced a blazed grating by rotation of suspended surfaces. Bloom et al. in U.S. Pat. No. 5,677,783 also presented a method for fabricating the device.

According to the prior art, for operation of the GLV device, an attractive electrostatic force is produced by a single polarity voltage difference between the ground plane and the conducting layer atop the ribbon layer. This attractive force changes the heights of the ribbons relative to the substrate. Modulation of the diffracted optical beam is obtained by appropriate choice of the voltage waveform. The voltage needed to actuate a ribbon a certain distance depends on several factors including the tensile stress in the ribbon material and the ribbon length.

It is well known that the ribbon elements of the GLV device possess a resonance frequency which depends primarily on the tensile stress, the density, and length of the ribbons. When a ribbon is actuated or released, it rings at its resonant frequency, which is typically between 1 and 15 MHz. The mechanical response of the ribbon elements is damped by the flow and compression of the layer of gas beneath the ribbons. This phenomenon is referred to as squeeze film damping. It depends on the type of gas present, the pressure, film thickness etc. This damping determines the width of the resonant peak associated with the resonant frequency of the ribbons. As a result of this resonant ringing, the maximum frequency at which the GLV device can be operated is limited, and the diffracted light intensity contains undesirable temporal variations. These temporal variations in a data stream give rise to undesired data errors. Therefore, there is a need for a GLV device having increased operating speed and reduced temporal light intensity variations.

SUMMARY OF THE INVENTION

It is an object of the present invention to provide an optical modulation system with a self-damped diffractive light modulator for a beam of light in accordance with an input data stream that is particularly suitable for input data rates greater than 2 MHz.

This object is achieved by a system for modulating a beam of light in accordance with an input data stream having a data rate greater than 2 MHz, comprising:

(a) a source of light for directing light along a predetermined path;

(b) a self-damped diffractive light modulator disposed in the predetermined path and having a plurality of spaced apart self-damped deformable elements being disposed relative to each other and secured at opposite ends and suspended above and movable into a channel containing a gas, and each spaced apart self-damped deformable element having at least one reflective surface;

(c) means responsive to the input data stream for applying forces to each of the spaced apart self-damped deformable elements to cause the spaced apart self-damped deformable elements to deform and move into the channel so that the spaced apart self-damped deformable elements are movable between first and second positions in accordance with the input data stream; and (d) the self-damped diffractive light modulator modulating the light beam and directing the modulated light to a light utilization device where the modulated light can be recorded or decoded, the spaced apart self-damped deformable elements being sufficiently damped to minimize the introduction of data errors into the modulated light beam.

In accordance with the present invention an optical data modulation system with a self-damped diffractive light modulator suitable for 2 MHz data rates is disclosed. The system represents a significant improvement over existing technology in terms of its data throughput, reliability, and manufacturability. The modulator can readily be optimized at standard ambient conditions, which substantially simplifies fabrication and packaging, and reduces per unit costs.

DETAILED DESCRIPTION OF THE INVENTION

Figure 1:
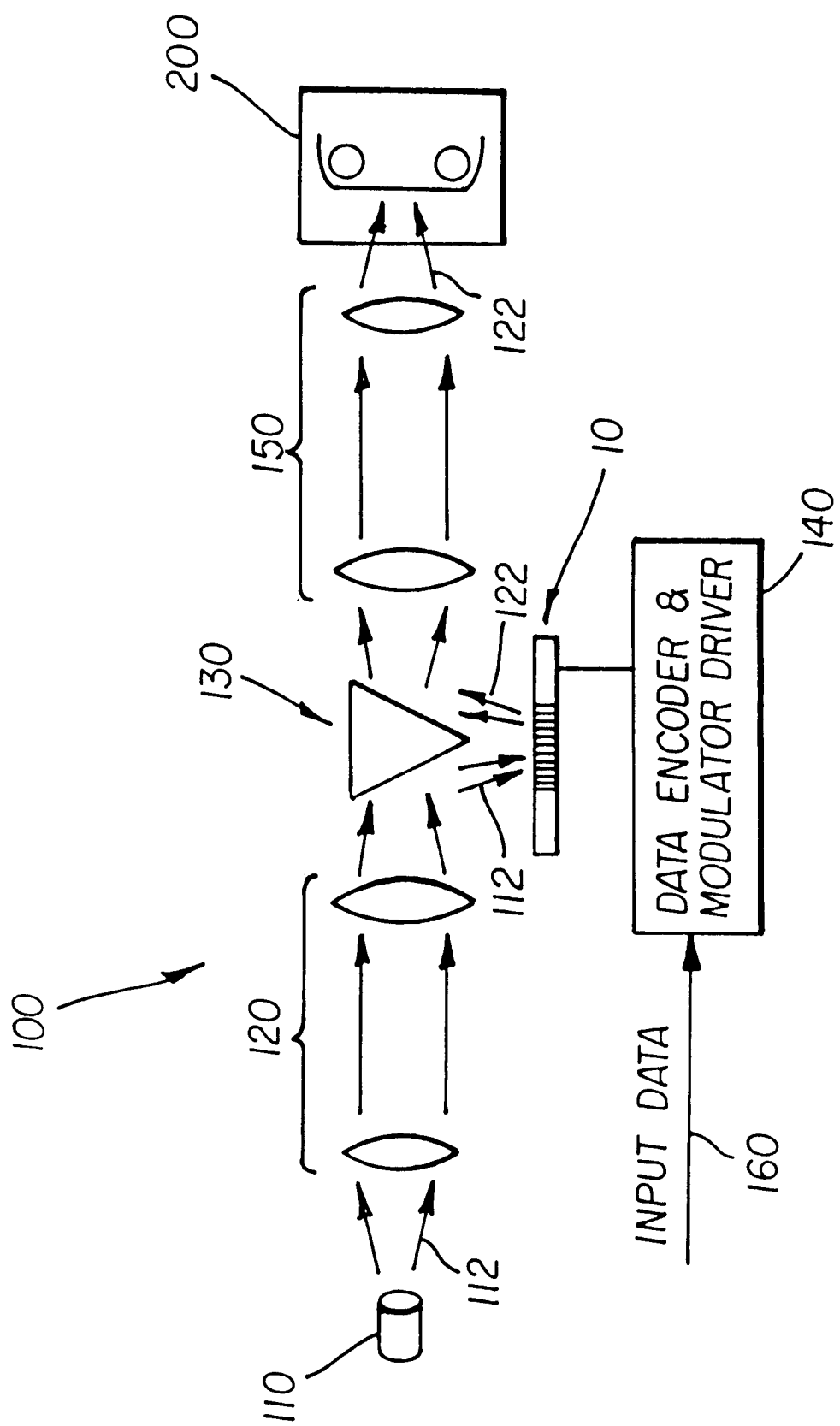
FIG. 1 is a schematic of the optical data modulation system of the present invention used in an optical data storage application.

FIG. 1 shows a schematic of an optical data modulation system 100 of the present invention used in an optical data storage application. The optical data modulation system 100 includes a light source 110, an optical system 120, a light directing element 130, a data encoder and modulator driver 140, a self-damped diffractive light modulator 10, an optical system 150, and a light utilization device 200. The light source 110 is preferably a laser or LED. The light directing element 130 is preferably a mirrored prism.

The operation of the optical data modulation system 100 is as follows: Light 112 from the light source 110 is focused by the optical system 120 onto the light directing element 130 which directs the light 112 unto the self-damped diffractive light modulator 10. The data encoder and modulator driver 140 activates the self-damped diffractive light modulator 10 to modulate the incident light in accordance with an input data stream 160. Modulated light 122 leaves the self-damped diffractive light modulator 10 and is incident on the light directing element 130. The light directing element 130 directs the modulated light 122 onto an optical system 150. The optical system 150 focuses the modulated light 122 onto a light utilization device 200, which in this embodiment is a high-speed data storage system. Specifically, in this embodiment the light utilization device 200 is an optical data recorder which uses an optically sensitive storage media that consists of a movable light sensitive surface which records data in response to the modulated light 122. In this way, the input data stream 160 is stored in a digital format on an optically sensitive storage media for subsequent retrieval and use. The optical data modulation system 100 is particularly suitable for operation at data rates above 2 MHz.

Figure 2A:
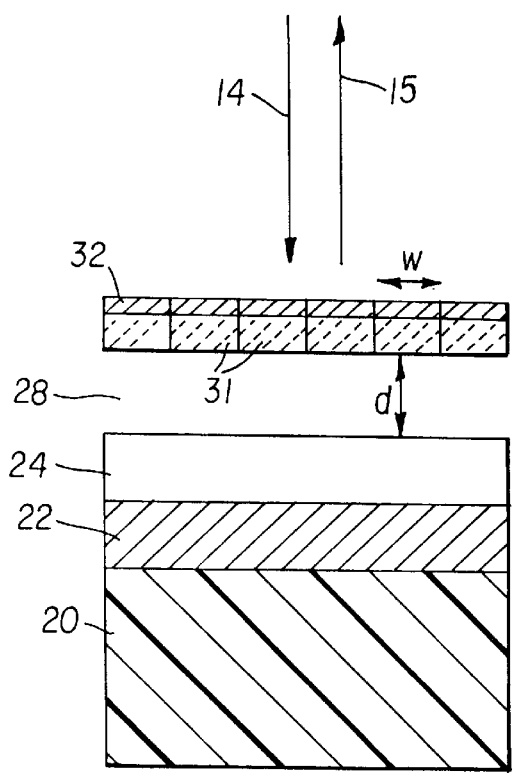
FIGS. 2a–2b are illustrations of a self-damped diffractive light modulator in the un-actuated and actuated state respectively.
Figure 2B:
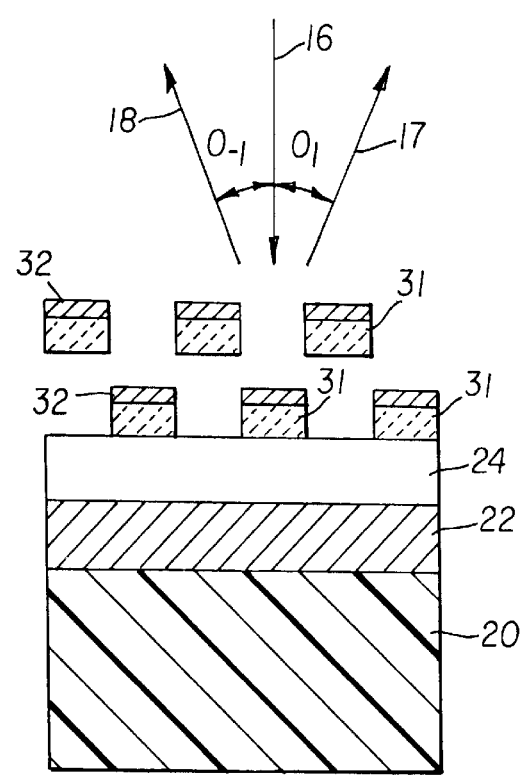
Figure 3:
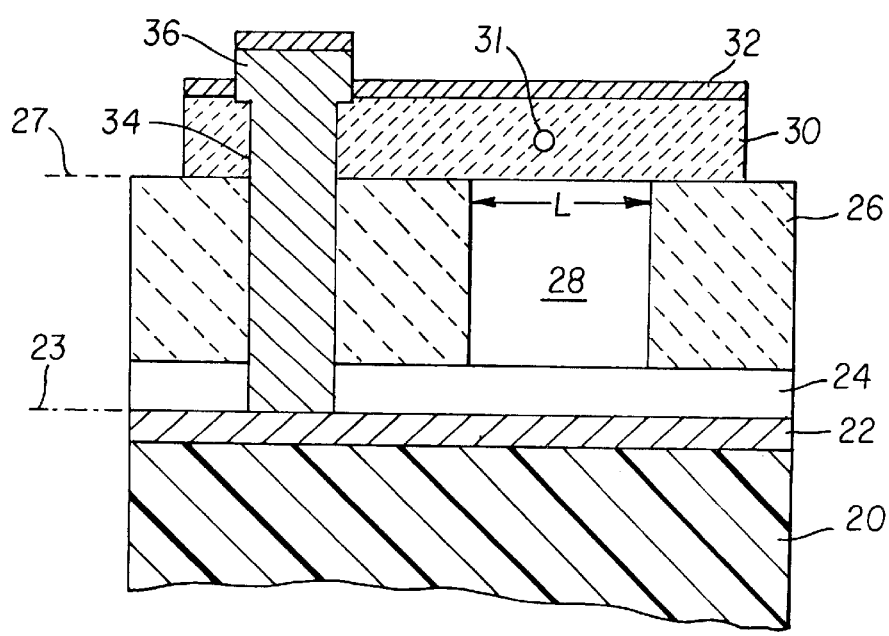
FIG. 3 is a view perpendicular to the self-damped diffractive light modulator of FIG. 2 showing a suspended un-actuated deformable ribbon element above a channel with the structure of the supporting layers.

Referring to FIGS. 2a, 2b and 3, the structure of the self-damped diffractive light modulator 10 is shown in cross-sectional views in an un-actuated, actuated, and un-actuated state, respectively. FIGS. 2a and 2b depict the ribbon structure of the device in the un-actuated and actuated state, respectively. FIG. 3 is the view of the same device (as shown in FIG. 2a) in the un-actuated state, but rotated 90 degrees to provide an insight into the layer structure. Referring to FIG. 3, typically a substrate 20 is provided which may be a single crystal silicon wafer or glass. In the case of a single crystal silicon wafer, a bottom conductive layer 22 is generated by heavily doping the silicon near the surface 23 of the substrate 20. If glass is used as a substrate, the increased conductivity is achieved by depositing a bottom conductive layer 22 on the surface of the substrate 20. The bottom conductive layer 22 is covered by a protective layer 24 which, for the example of a silicon substrate, can be thermal oxide. A dielectric spacer layer 26 is formed on the protective layer 24 and contains a channel 28 where the active region of the light modulator 10 is located. The channel 28 defines a depth h which is governed by the deposited thickness of the spacer layer 26, and a length L which is determined by patterning the spacer layer 26. The spacer layer 26 defines an upper surface level 27. A plurality of deformable ribbon elements 31 of width w are patterned from a ribbon layer 30 formed atop the spacer layer 26. The ribbon layer 30 includes a dielectric material, which can be silicon nitride, covered by a conductive and reflective layer 32. The conductive and reflective layer 32 of every other deformable ribbon element 31 is connected to the bottom conductive layer 22 through an opening 34 that is filled with a thick layer of conducting material 36. The thickness and tensile stress of the ribbon layer 30 is chosen to optimize performance by influencing the electrostatic force required for actuation and the returning force, which affects the speed, resonance frequency, and voltage requirements of the deformable ribbon elements 31.

For operation of the device, an attractive electrostatic force is produced by a voltage difference between the bottom conductive layer 22 and the reflective and conductive layer 32 atop the ribbon layer 30. In the un-actuated state (see FIG. 2a), with no voltage difference, all of the deformable ribbon elements 31 of the light modulator 10 are suspended above the substrate 20 at the same height. In this state, an incident light beam 14 is primarily reflected into the mirror direction ($0^{th}$ order) as a reflected light beam 15. To obtain the actuated state (see FIG. 2b), a voltage is applied to every other deformable ribbon element 31 producing a periodic grating. In the fully actuated state every other deformable ribbon element 31 is in contact with the protective layer 24. When the height difference between adjacent ribbons is ¼ of the wavelength of the incident light beam 16, the light beam is primarily diffracted into a $1^{st}$ order 17 and a $-1^{st}$ order 18. One or both of these diffracted orders can be collected and used by an optical system (not shown). Alternatively, in certain applications, the $0^{th}$ order reflected light can be used by the system. When the applied voltage is removed, the forces due to the tensile stress and the bending moment restore the deformable ribbon elements 31 to their original un-actuated state (see FIG. 2a).

Figure 4:
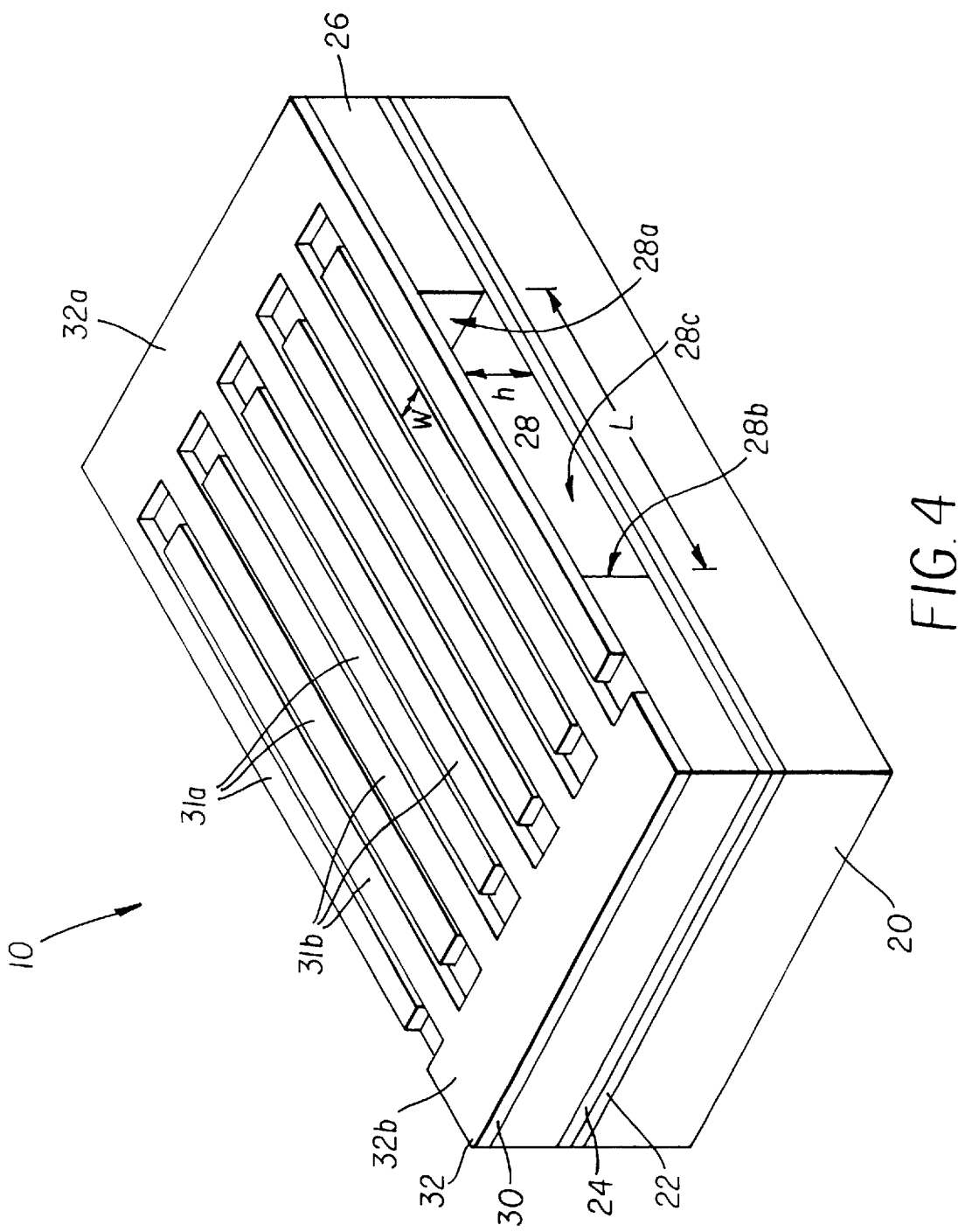
FIG. 4 is a partially cut-away perspective of a self-damped diffractive light modulator.

FIG. 4 is a partially cut-away perspective of the self-damped diffractive light modulator 10 shown in FIGS. 2 and 3. The spacer layer 26 has a longitudinal channel 28 with a first and second side wall 28a and 28b, and a bottom 28c. The channel 28 is open to the top and covered by a first and a second set of deformable ribbon elements 31a and 31b. Each deformable ribbon element 31a and 31b spans the channel 28 and is secured to the surface of the spacer layer 26 on either side of the channel 27. The bottom 28c of the channel 28 is covered by the protective layer 24. As mentioned above, the ribbon layer 30 is covered by the conductive and reflective layer 32. The conductive and reflective layer 32 is patterned such that there is a first and a second conducting region 32a and 32b with a comb-like structure arranged in an interdigitated manner. The first and second conductive region 32a and 32b are mechanically and electrically isolated from one another. According to the pattern of the conductive and reflective layer 32 the ribbon layer 30 is patterned in the same manner. As a result, there are the first and the second set of deformable ribbon elements 31a and 31b spanning the channel 28 and arranged such that every other deformable ribbon element belongs to one set. At the bottom 28c of the channel 28 a plurality of standoffs (not shown) may be formed in order to minimize the contact area between the bottom surface of the deformable ribbon elements 31 and the bottom 28c of the channel 28. This reduction in contact area is known to reduce the risk of failure of the deformable ribbon elements 31a and 32b as a result of adhesion forces, which is also known as stiction failure.

Figure 5:
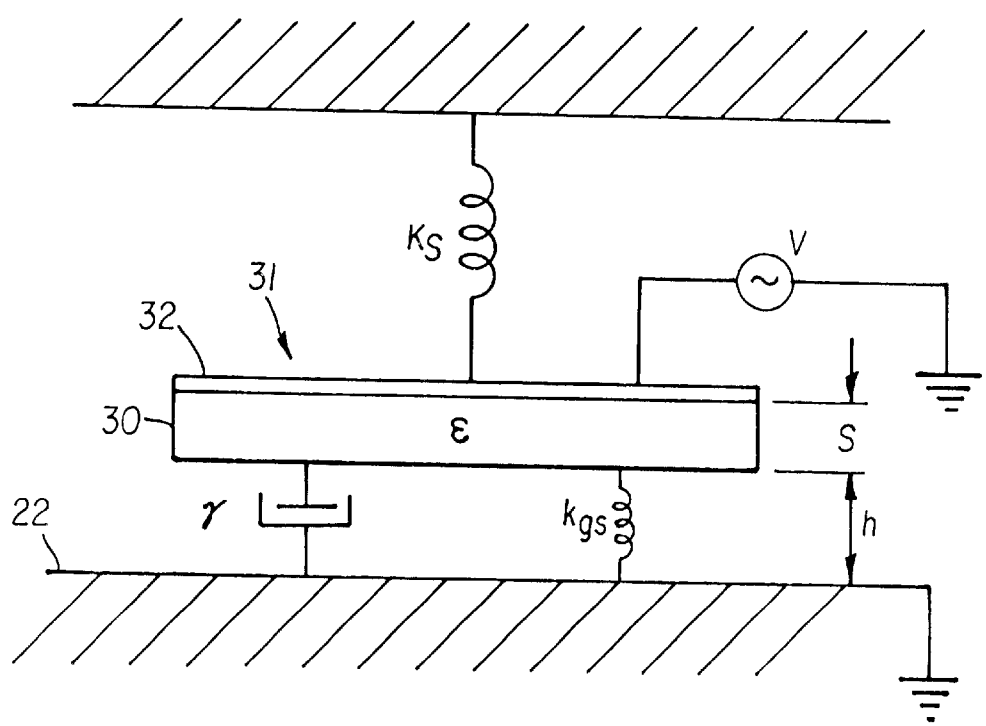
FIG. 5 is a damped spring-mass system that serves as a model for the transient behavior of a deformable ribbon element.

Referring to FIGS. 3, 4, and 5 the deformable ribbon elements 31 of the self-damped diffractive light modulator 10 can be modeled as a damped-spring- mass system (see E. P. Furlani, "Theory and Simulation of Viscous Damped Reflection Phase Gratings," J. Phys. D: Appl. Phys, 32 (4), 1999). Referring to FIG. 5, the motion of the center of the deformable ribbon elements 31 is described by the following differential equation, $$\frac{d^2y}{dt^2} = F_e(y) - \gamma \frac{dy}{dt} - (K_s + k_{gs})y$$

where y(t) is the vertical displacement of the center of the deformable ribbon elements 31 from their un-actuated (up) position, $F_e(y)$ is the electrostatic force of attraction, $K_s$, is the spring constant of the deformable ribbon elements 31, and $\gamma$, and $k_{gs}$ are damping and spring constants due to squeeze film effects as described below. The electrostatic force is given by $$F_e(y) = K_e \frac{V^2}{[\varepsilon_0 s + \varepsilon(h-y)]^2},$$

where $$K_e = \frac{\varepsilon^2 \varepsilon_0 A}{2},$$

and A=wL, V is the voltage applied between the bottom conductive layer 22 and the reflective and conductive layer 32 atop the ribbon layer 30, $\varepsilon_0$ and $\varepsilon$ are the permittivities of free space and the ribbon material 30, respectively, L is the length of the ribbon, h is the height of the channel 28 that is between 100 nanometers and 300 nanometer; and y is the displacement of the center of the deformable ribbon element 31 from its un-activated position. The ribbon spring constant $K_s$ is given by $$K_s = \frac{4T}{L},$$

where T=$T_s$ws, and $T_s$, w and s are the tensile stress, width and thickness of the ribbon layer 30, respectively. The squeeze-film damping and spring coefficients are given by $$\gamma = \frac{64\sigma P_a A}{\pi^6 d} \sum_{n=odd} \sum_{m=odd} \frac{m^2 + c^2 n^2}{(mn)^2[(m^2 + c^2 n^2) + \sigma^2/\pi^4]}, \text{ and}$$

$$k_{gs} = \frac{64\sigma^2 P_a A}{\pi^6 d} \sum_{n=odd} \sum_{m=odd} \frac{m^2 + c^2 n^2}{(mn)^2[(m^2 + c^2 n^2) + \sigma^2/\pi^4]}.$$

where $P_a$ is the ambient pressure, A=Lw, c=w/L, and m and n are summation indices. The parameter $\sigma$ is given by $$\sigma = \frac{12\mu_{eff} w^2}{P_a d^2} \omega,$$

where $\mu_{eff}$ is the effective viscosity of the gas, $\omega=2\pi f$, and f is the frequency of oscillation of the deformable ribbon elements 31 (see T. Veijola, H. Kuisma, T. Ryhanen, "Equivalent-circuit model of squeezed gas film in a silicon accelerometer," Sensors and Actuators A 48, 1995).

After the ribbon has been pulled down. The voltage V is set to zero and the response of the deformable ribbon elements 31 is governed by the $$\frac{d^2y}{dt^2} + \gamma \frac{dy}{dt} + (K_s + k_{gs})y = 0,$$

equation The solution of this equation for a damped response is of the form $$y(t)=R\exp(-\gamma/2m)\cos(\beta t - \delta),$$

where R is the amplitude of oscillation, $\gamma$ is a damping coefficient, $\delta$ is a phase factor and $$\beta = \frac{[4(K_s + k_{gs})m - \gamma^2]^{1/2}}{2m}.$$

It is instructive to note that because of the functional form of $\gamma$, $k_{gs}$ and $K_s$, the response of the deformable ribbon elements 31 depends in a complex way on numerous device parameters including the dimensions and material properties of the deformable ribbon elements 31, the gas in the channel 28, the channel height h, and the ambient temperature and pressure. Therefore, in general, it is difficult to determine specific values for the device parameters that render a desired frequency response of the self-damped diffractive light modulator 10. For low frequency applications, with data rates in the 100 kHz range, there is a relatively wide range of viable parameter values that render the diffractive light modulator 10 self-damped. Therefore, it is relatively easy to design and fabricate a self-damped diffractive light modulator 10 for low frequency applications. However, for high-frequency applications, with data rates greater than 2 MHz, the range of viable parameters is limited and difficult to determine.

Figure 6A:
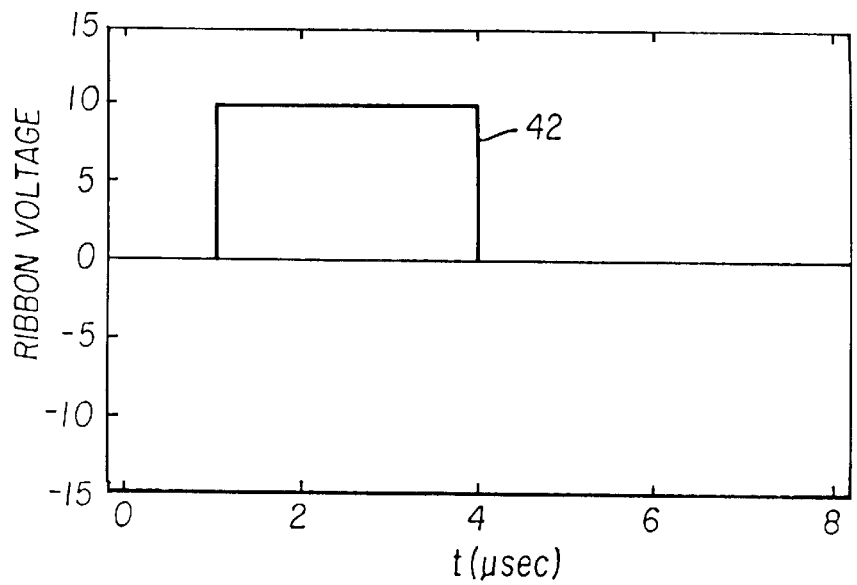
FIGS. 6a, 6b and 6c show an activation voltage pulse, ribbon displacement, and modulated light intensity into the 0'th order for an underdamped diffractive light modulator, respectively.
Figure 6B:
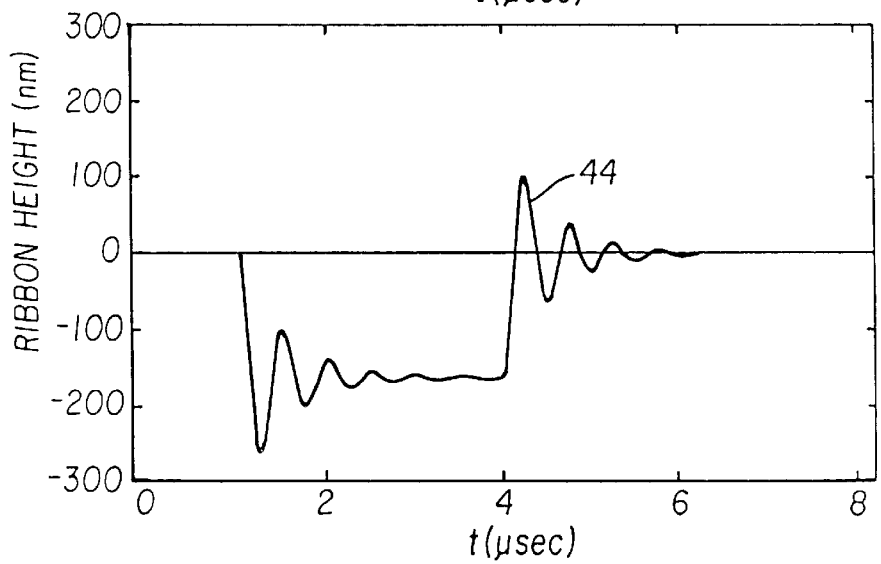
Figure 6C:
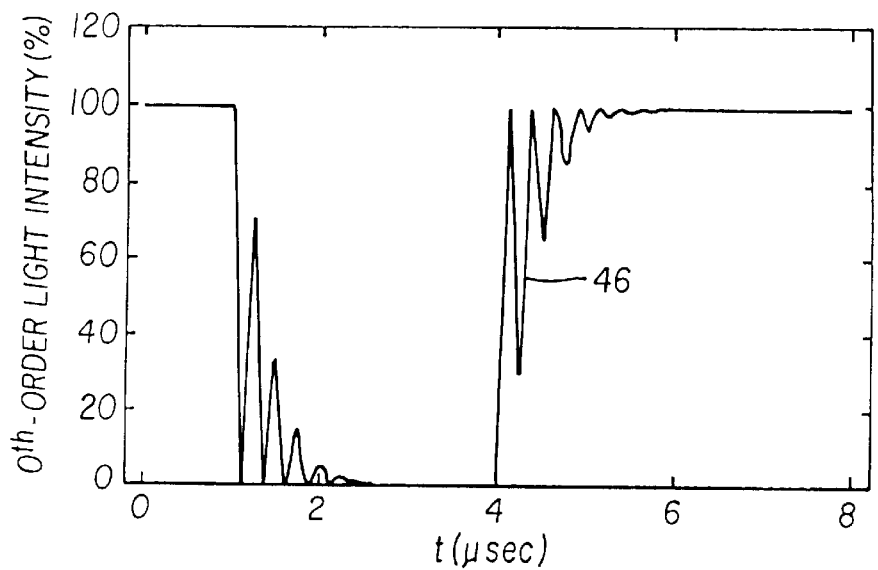

FIGS. 6a, 6b and 6c illustrate the activation and response of an underdamped diffractive light modulator. Specifically FIGS. 6a, 6b and 6c show plots of an activation voltage pulse 42, ribbon displacement 44, and modulated light intensity 46 into the 0'th order for an underdamped diffractive light modulator. The underdamped diffractive light modulator has substantially the same structure and operation as the self-damped diffractive light modulator 10 except that its deformable ribbon elements 31 tend to ring (oscillate) upon activation as described above. FIG. 6a shows an input voltage pulse 42 that is applied between the bottom conductive layer 22 and the reflective and conductive layer 32 atop the ribbon layer 30. FIG. 6b shows the response of the deformable elements 31 to the input voltage pulse 42 of FIG. 6a. Specifically, it shows the displacement 44 of the center point of the deformable ribbon elements 31. FIG. 6c shows a profile of the modulated light intensity 46 into the 0'th order. The 0'th order corresponds to the modulated reflected light. It is instructive to note that the modulated light intensity 46 of an underdamped light modulator is characterized by an oscillatory temporal variation due to the ringing of the underdamped deformable elements 31. This oscillatory temporal variation is undesired for high-frequency optical data modulation because it causes data errors.

Figure 7A:
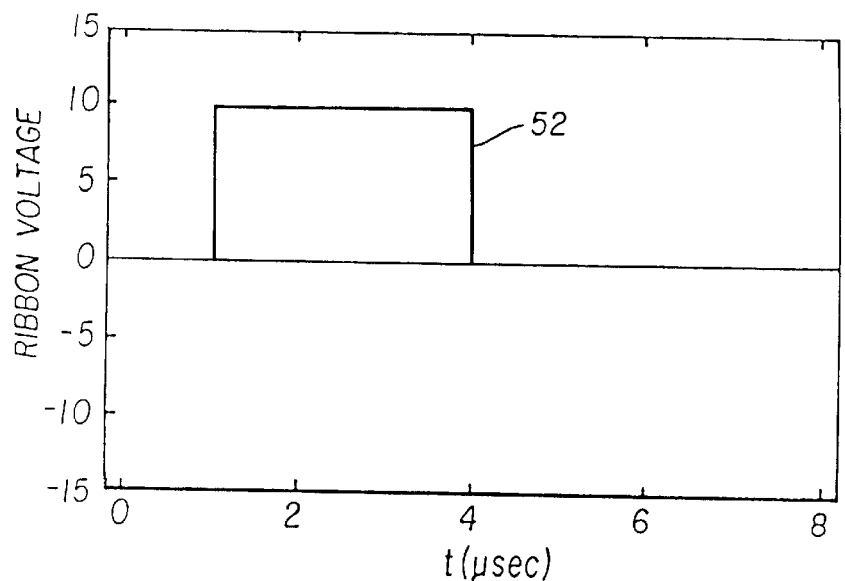
FIGS. 7a, 7b and 7c show an activation voltage pulse, ribbon displacement, and modulated light intensity into the 0'th order for a self-damped diffractive light modulator, respectively.
Figure 7B:
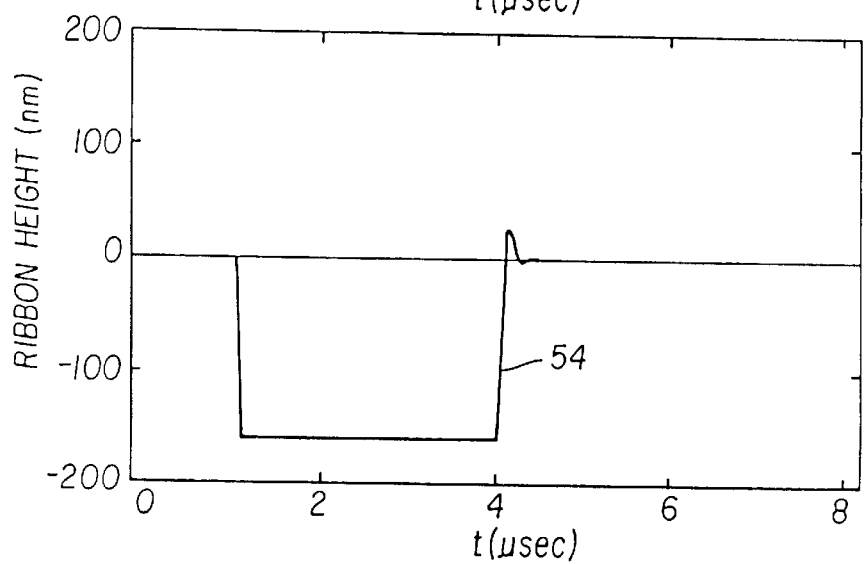
Figure 7C:
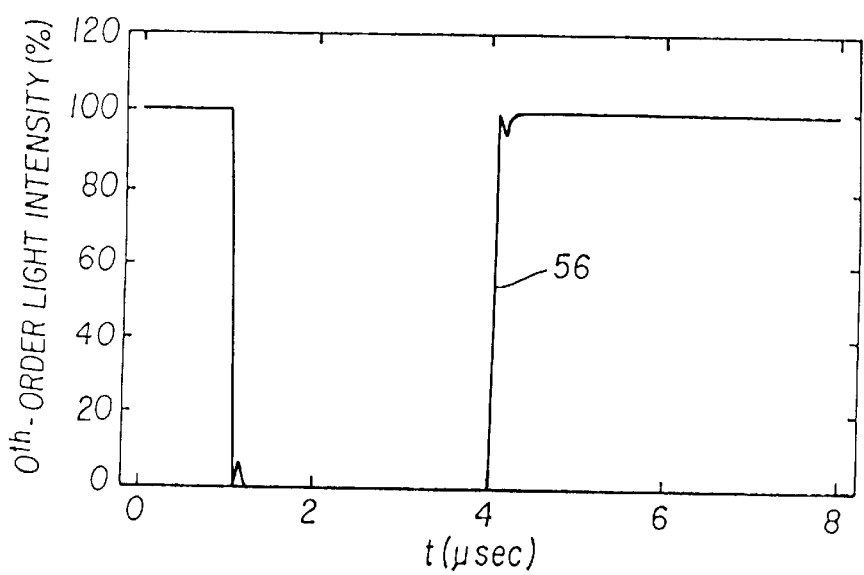

FIGS. 7a, 7b and 7c illustrate the activation and response of a self-damped diffractive light modulator 10. Specifically, FIGS. 7a, 7b and 7c show plots of an activation voltage pulse 52, ribbon displacement 54, and modulated light intensity 56 into the 0'th order for a self-damped diffractive light modulator 10, respectively. FIG. 7a shows an input voltage pulse 52 that is applied between the bottom conductive layer 22 and the reflective and conductive layer 32 atop the ribbon layer 30. FIG. 7b shows the response of the deformable elements 31 to the input voltage pulse 52 of FIG. 6a. Specifically, it shows the displacement of the center of the deformable elements 31. FIG. 7c shows a profile of the modulated light intensity 56 into the 0'th order that is generated by a self-damped diffractive light modulator 10 in response to the input voltage pulse 52. It is instructive to note that the modulated light intensity 56 of the self-damped diffractive light modulator 10 exhibits a minimal temporal oscillation of the modulated light. This is desired for high-frequency optical data modulation because it provides an error free representation of the input data stream 160.

Figure 8A:
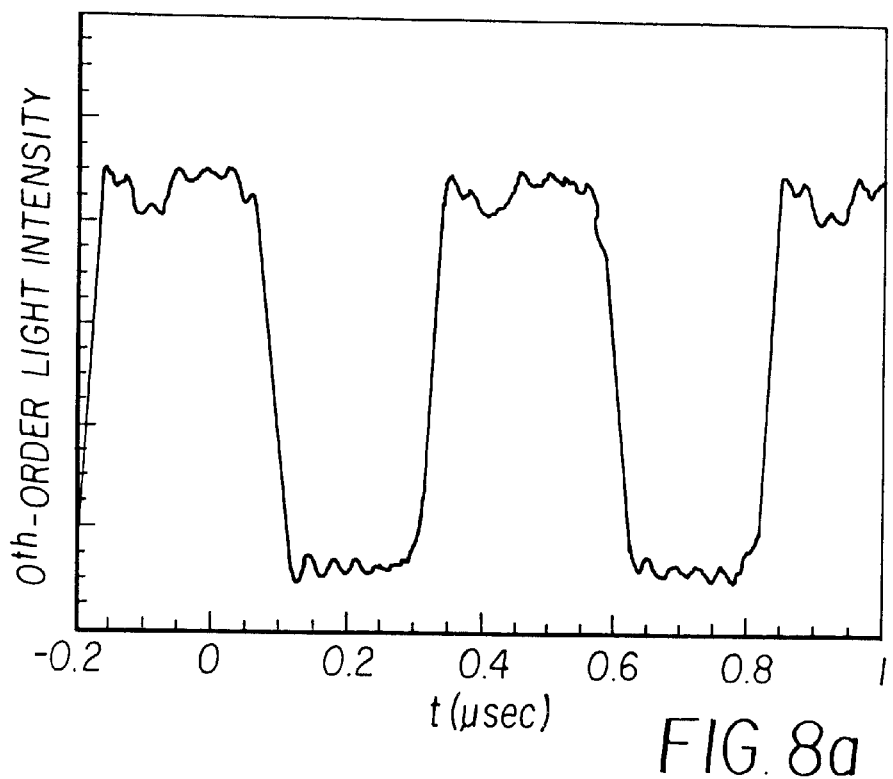
FIGS. 8a and 8b are plots of the 0'th order modulated light intensity from a fabricated self-damped diffractive light modulator operating in a contact and noncontact mode, respectively; and, FIG. 9 is a schematic of an alternate embodiment of an optical data modulation system which is used for optical data transmission.
Figure 8B:
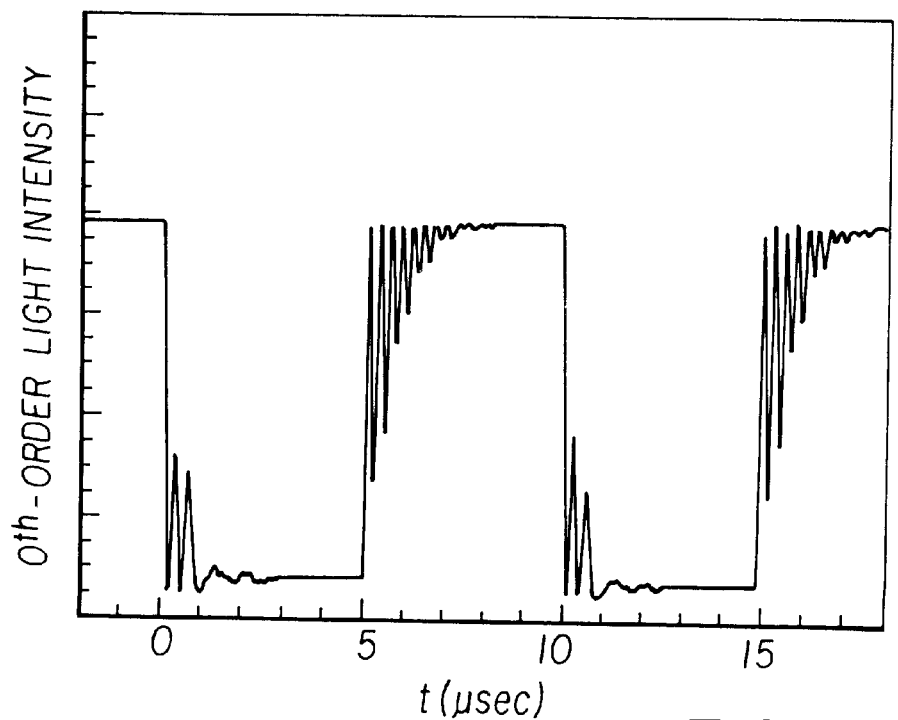

FIGS. 8a and 8b show experimental data for the light intensity from a self-damped and underdamped modulator, respectively. A self-damped light modulator 10 for use at a 2 MHz data rate was fabricated. The deformable ribbon elements 31 in this modulator have the follows parameters: ribbon thickness=170 nm, ribbon tensile stress=1100 MPa, L=60 $\mu$m, w=4 $\mu$m and h=150 nm. The gas in the channel 28 is air at standard temperature and pressure, which simplifies device packaging. Modification of the gas type, temperature and pressure can be used to increase damping, but requires more complex and expensive packaging. The experimental response of the fabricated self-damped light modulator 10 to a 2 MHz input data stream is shown in FIG. 8a. This figure depicts the 0'th order light intensity. Because the light modulator is self-damped, the modulated light intensity has minimal temporal variation, which is less than 20% of the peak modulated intensity. Therefore, this light modulator is well suited for use with 2 MHz data rates. The fabricated self-damped diffractive light modulator 10 functions in contact mode, whereby the deformable ribbon elements 31 are displaced vertically by 150 nm when actuated, and make mechanical contact with the bottom of the channel 28. The self-damped diffractive light modulator 10 is preferably of this contact-mode type. For optimum diffraction efficiency, the vertical displacement upon actuation needs to be approximately ¼ of the wavelength of the incident light 112.

Non-contact mode operation is often used to eliminate failure of deformable ribbon elements 31 due to sticking to the substrate (also known as stiction failure). Such devices also operate with a vertical displacement that is ¼ of the wavelength of the incident light 112, but have a height h approximately equal to the wavelength. The experimental response of a diffractive light modulator designed for non-contact mode operation is shown in FIG. 8b. Even though the input data stream is now only 100 KHz, the 0'th order intensity shows several cycles of underdamped oscillations. For this device, the parameters of the deformable ribbon elements 31 are as follows: ribbon thickness=170 nm, ribbon tensile stress=1100 MPa, L=120 $\mu$m, w=4 $\mu$m and h=600mn. This example illustrates the difficulty associated with designing diffractive light modulators that are self-damped and are capable of responding to a 2 MHz input data stream.

In high-speed optical data modulation system applications the oscillation of the deformable ribbon elements 31 must be kept to a minimum to avoid data errors. Specifically, any oscillation of the deformable ribbon elements 31 about their equilibrium position gives rise to an output signal. Moreover, if an oscillation is of sufficient amplitude, it will register as a data bit error. The criteria for a an optical data modulation system that is viable for data rates above 2 MHz are as follows: The self-damped diffractive light modulator 10 must be capable of producing a pulse of modulated light of intensity of constant amplitude $I_m$ that has a temporal duration $\tau \leq 250$ ns. Moreover any undesired oscillations of the deformable ribbon elements 31 must be limited so that the intensity of the modulated light resulting from such oscillations is less than 20 % of $I_m$.

Figure 9:
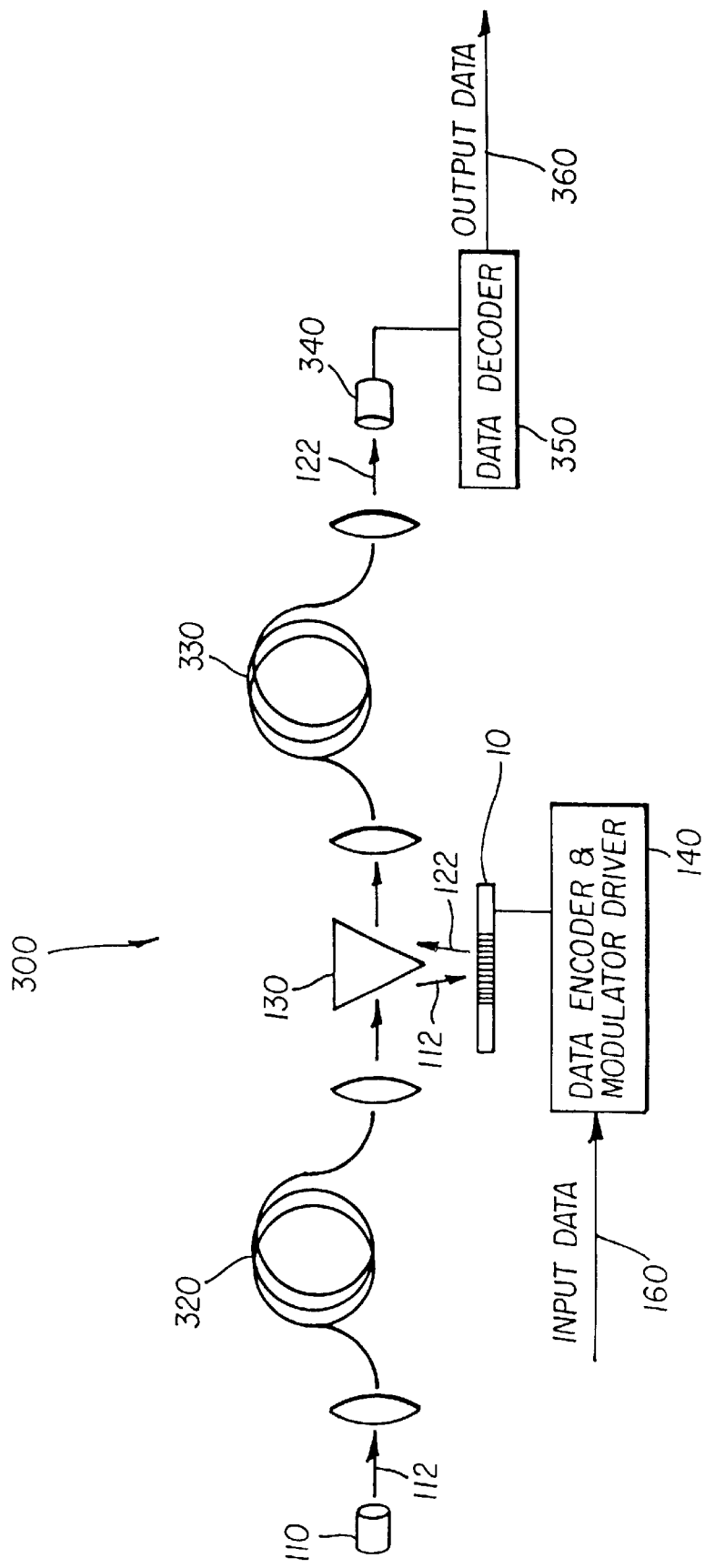

FIG. 9 is a schematic of an alternate embodiment of optical data modulation system in which it is used for optical data transmission. The optical data modulation system 300 includes of a light source 110, a light transmission system 320, a light directing element 130, a data encoder and modulator driver 140, and input data stream 160, a self-damped diffractive light modulator 10, an light transmission system 330, a light sensor 340 and a data decoder 350. The light source 110 is preferably a laser or LED. The light directing element 130 is preferably a mirrored prism, the light transmission systems 320 and 330 are preferably optical fiber systems, and the light sensor 340 is preferably a photodiode.

The operation of the optical data modulation system 300 is as follows: Light 112 from the light source 110 is transmitted by the light transmission system 320 onto the light directing element 130 which directs the light 112 unto the self-damped diffractive light modulator 10. The data encoder and modulator diver 140 activates the self-damped diffractive light modulator 10 to modulate the incident light in accordance with an input data stream 160. The modulated light 122 leaves the self-damped diffractive light modulator 10 and is incident on the light directing element 130. The light directing element 130 directs the modulated light 122 onto the light transmission system 330. The light transmission system 330 directs the modulated light 122 onto a light sensor 340. The light sensor 340 outputs data into a data decoder 350 which outputs the decoded data in the form of and output data stream 360 for use in a variety of optical transmission and communications equipment.

The invention has been described in detail with particular reference to certain preferred embodiments thereof, but it will be understood that variations and modifications can be effected within the spirit and scope of the invention.

PARTS LIST 10 self-damped diffractive light modulator
14 incident light beam
15 reflected light beam
16 incident light beam
17 diffracted light beam $1^{st}$ order
18 diffracted light beam $-1^{st}$ order
20 substrate
22 bottom conductive layer
23 surface of the substrate
24 protective layer
26 spacerlayer
27 upper surface level
28 channel
28a side wall of channel
28b side wall of channel
28c bottom of channel
30 ribbon layer
31 deformable ribbon elements
31a first set of deformable ribbon elements
31b second set of deformable ribbon elements
32 conductive and reflective layer
32a first conducting region
32b second conducting region
34 opening
36 conducting material 42 voltage pulse
44 underdamped ribbon displacement
46 underdamped modulated light intensity
52 voltage pulse
Parts List Cont'd
54 self-damped ribbon displacement
56 self-damped modulated light intensity
100 optical data modulation system
110 light source
112 incident light
120 optical system
122 modulated light
130 light directing element
140 data encoder and modulator driver
150 optical system
160 input data stream
200 light utilization device
300 optical data modulation system
320 light transmission system
330 light transmission system
340 light sensor
350 data decoder
360 output data stream

What is claimed is:

1. A system for modulating a beam of light in accordance with an input data stream having a data rate greater than 2 MHz, comprising:

(a) a source of light for directing light along a predetermined path;

(b) a self-damped diffractive light modulator disposed in the predetermined path and having a plurality of spaced apart self-damped deformable elements being disposed relative to each other and secured at opposite ends and suspended above and movable into a channel containing a gas, and each spaced apart self-damped deformable element having at least one reflective surface;

(c) means responsive to the input data stream for applying forces to each of the spaced apart self-damped deformable elements to cause the spaced apart self-damped deformable elements to deform and move into the channel so that the spaced apart self-damped deformable elements are movable between first and second positions in accordance with the input data stream; and (d) the self-damped diffractive light modulator modulating the light beam and directing the modulated light to a light utilization device where the modulated light can be recorded or decoded, the spaced apart self-damped deformable elements being sufficiently damped to minimize the introduction of data errors into the modulated light beam.

2. The system of claim 1 wherein the light utilization device includes a data recorder including a movable light sensitive surface which records data in response to the modulated light.

3. The system of claim 2 wherein the light utilization device includes an optical detection means for receiving the modulated light and producing output data demodulated from the modulated light beam.

4. The system of claim 1 wherein the gas is under standard atmospheric pressure and temperature.

5. The system of claim 1 wherein the spaced apart deformable elements have a width greater than 3 microns and less than 8 microns.

6. The system of claim 1 wherein the spaced apart deformable elements are suspended above bottom of the channel at a height between 100 nanometers and 300 nanometers.

7. The system of claim 1 wherein the spaced apart deformable elements make mechanical contact with bottom of the channel when actuated.

* * * * *